United States Patent [19]
Farr

[11] 3,738,334
[45] June 12, 1973

[54] EMISSION REDUCTION SYSTEM
[75] Inventor: Richard S. Farr, Los Angeles, Calif.
[73] Assignee: Farr Company, El Segundo, Calif.
[22] Filed: Dec. 16, 1971
[21] Appl. No.: 208,851

[52] U.S. Cl............................ 123/34 A, 123/122 E
[51] Int. Cl............................................ F02m 31/18
[58] Field of Search................ 123/122 E, 198 DB, 123/120, 34, 35

[56] References Cited
UNITED STATES PATENTS

| | | | |
|---|---|---|---|
| 2,315,881 | 4/1943 | Thomas | 123/133 |
| 990,741 | 4/1911 | Jacobs | 123/122 E |
| 1,311,504 | 7/1919 | Ford | 123/122 E |
| 2,130,666 | 9/1938 | Coffey | 123/122 E |
| 1,559,214 | 10/1925 | Woolson | 123/122 E |
| 3,651,794 | 3/1972 | Douglas | 123/120 |
| 1,461,662 | 7/1923 | Kawamura | 123/198 DB |
| 3,664,315 | 5/1972 | Kramer | 123/120 |

FOREIGN PATENTS OR APPLICATIONS
343,489  12/1919  Germany.......................... 123/122 E

*Primary Examiner*—Al Lawrence Smith
*Assistant Examiner*—Dennis Toth
*Attorney*—Charles G. Lyon, John B. Young, Richard Elgar Lyon et al.

[57] ABSTRACT

An emission reduction system for use with a conventional internal combustion engine which includes a pressure vessel, means for supplying the pressure vessel with gasoline fuel, means for actuating said supplying means, means for directing the engine exhaust into close proximity with the pressure vessel to vaporize the gasoline therein, a valve for controlling the engine exhaust, a fuel supply conduit for directing the gasoline vapor to the engine carburetor and means for regulating the gasoline vapor pressure.

11 Claims, 1 Drawing Figure

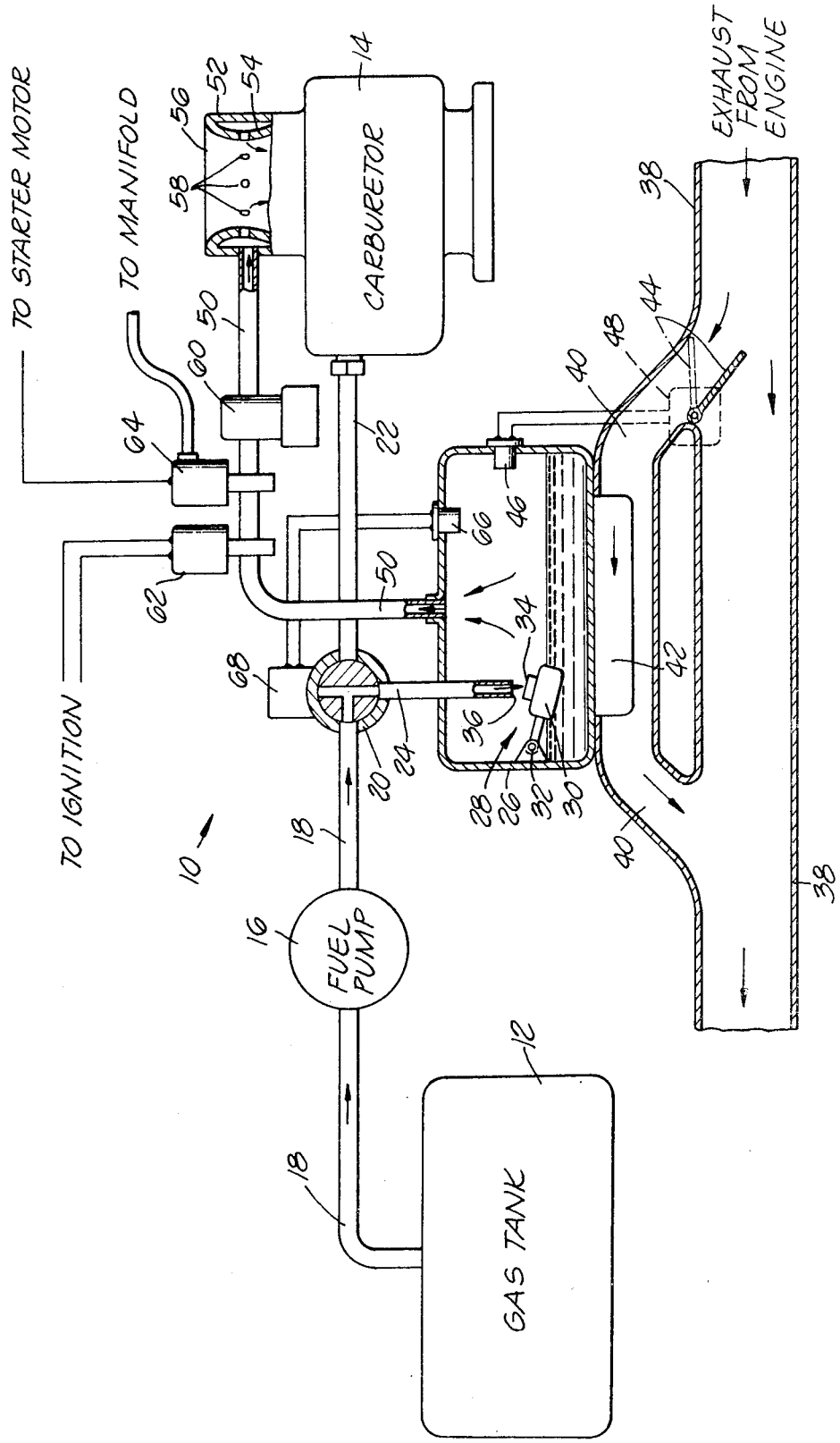

EMISSION REDUCTION SYSTEM

BACKGROUND OF THE INVENTION

The internal combustion engine is currently under attack as one of the major pollutors of our environment. Several approaches have been undertaken in an attempt to reduce the polluting emissions from such engines. One approach to the problem is the utilization of a fuel vaporization device. In a standard internal combustion engine, liquid gasoline and air are mixed together in the carburetor and then ignited in a combustion chamber. Because a liquid is being mixed with a vapor, imperfect mixing takes place, resulting in unmixed gasoline droplets. These droplets are not burned in the combustion chamber and eventually enter the atmosphere through the engine's exhaust as unburned hydrocarbons which contaminate the air. If, however, the gasoline were introduced into the carburetor in a vapor state, a much more thorough mixing would take place due to the fact that a vapor is being mixed with another vapor. The result of such a mixing would be a more complete burning in the combustion chamber, resulting in an increase in the efficiency of the engine and substantial reduction of the polluting gasoline droplets.

Another result of the imperfect mixing in a standard internal combustion engine is gasoline condensation on the side walls of the cylinders. This condensed gasoline mixes with the oil on the cylinder walls thereby diluting the oil. This phenomenon is called fuel dilution and results in a buildup of gasoline in the lubricating oil. When the engine is then run over a continuous period of time, the oil is heated and the gasoline therein evaporates out of the oil leaving an oil shortage. Fuel dilution is also reduced by the improved mixing of the air with gasoline vapor rather than liquid.

A proposal for vaporizing the gasoline before introduction into the carburetor is set forth in U.S. Pat. No. 2,882,882. This proposal is, in effect, inoperative in that the device described is subject to exploding, particularly when the vehicle is not moving. The reason for this is that the gasoline vapors are not properly confined and are free to escape in an explosive atmosphere when the air intake pressure is reduced. Another proposal is found in U.S. Pat. No. 3,498,279. While the device described therein is seemingly less likely to explode than the prior proposal, it is adaptable solely for steady state operation and hence is not suitable for use in motor vehicles. The device has no provision for fuel regulation and therefore does not have the necessary control for aceleration. In addition, the gasoline present in the heat exchanger would vaporize due to the residual heat therein and expand outwardly, polluting the atmosphere.

It is the principal object of this invention to reduce the polluting emissions from the exhaust of an internal combustion engine. aceleration.

It is also an object of this invention to provide better mixing of the gasoline and air in the carburetor of an internal combustion engine.

It is another object of this invention to increase the efficiency of an internal combustion engine.

It is a further object of this invention to reduce fuel dilution.

It is a still further object of this invention to provide a device for accomplishing the above objects which is safe to operate.

These and other objects and advantages of the present invention will become apparent from the following detailed description taken in conjunction with the accompanying drawings.

SUMMARY OF THE INVENTION

Briefly, the emission reduction system includes a heated pressure vessel for vaporizing gasoline fuel and means for regulating and supplying the vaporized fuel to the carburetor of an internal combustion engine.

IN THE DRAWINGS

The drawing is a schematic diagram of the emission reduction system.

Referring now in detail to the drawing, the emission reduction system 10 utilizes a conventional gas tank 12 and a standard carburetor 14, equipped with a normal air intake (not shown). The gasoline stored in tank 12 is pumped by a fuel pump 16 through conduit 18 to a three-way valve 20. Valve 20 is operable to communicate conduit 18 with either conduit 22, which in turn communicates directly with carburetor 14, or with conduit 24 which leads to a closed pressure vessel 26. When valve 20 is set to communicate conduits 18 and 22, the gasoline being pumped therethrough flows into the carburetor and the engine is run in the conventional manner. Upon actuating the valve 20 to communicate conduit 18 with conduit 24, the gasoline is pumped into a pressure vessel 26. The pressure vessel is equipped with a float level control 28 which is comprised of a float member 30 pivotally mounted at 32 to the inside of the pressure vessel. Float 30 carries a stop 34. Stop 34 abuts the open end 36 of conduit 24 upon the level of gasoline within the pressure vessel reaching a desired level, thereby stopping the flow of gasoline into the vessel. When the gasoline level in the pressure vessel is reduced, the stop 34 moves away from the end 36 of conduit 24 and the gasoline flow resumes, thereby maintaining a desired gasoline level in pressure vessel 26.

The engine exhaust conduit 38 contains a heat exchange section 40, which passes into close proximity with pressure vessel 26. The exhaust from the engine passing through heat exchange conduit 40 rapidly heats the gasoline within the pressure vessel causing the gasoline therein to vaporize. A heat exchange fin 42 extends from the lower portion of the pressure vessel 26 into the heat exchange conduit 40 for improved heat transfer. A diverter valve 44 is positioned where conduit 40 communicates with exhaust conduit 38 to regulate the path of the engine exhaust. The position of the valve regulates the amount of engine exhaust flowing through conduit 40, thereby controlling the heat therein. The diverter valve is preferably pressure controlled. In the preferred embodiment, shown in the drawing, a pressure sensing means 46 is positioned within the pressure vessel 26. The sensing means activates a diverter valve control mechanism 48 to maintain the desired pressure within the pressure vessel. When the pressure within the vessel is below the optimum operating pressure, the control mechanism is activated to open the diverter valve 44 to increase the engine exhaust flow through conduit 40. If the pressure within the pressure vessel becomes too great, the diverter valve is actuated to decrease the opening to conduit 40, thereby reducing the engine exhaust flowing therethrough and lowering the temperature therein. This reduces the temperature within the pressure vessel thereby reducing the pressure until the desired level is reached. In alternate embodiments of the invention, the pressure sensing means is replaced with other sensing mechanisms which read different conditions such as temperature and would then similarly operate to activate the diverter valve control mechanism.

Upon vaporization of the gasoline within the pressure vessel 26, the gasoline vapor rises into conduit 50 which communicates the pressure vessel with a mixing chamber 52 of carburetor 14. The mixing chamber 52 houses the conventional venturi 54 and as the air is sucked down the throat 56 of the chamber it is mixed with the gasoline vapor entering from conduit 50 and through a plurality of apertures 58 in the walls of the venturi. In this manner, a vapor is mixed with another vapor resulting in a more thorough mixing and subsequently more complete burning in the combustion chamber.

A standard diaphram biased pressure regulator 60 is positioned within conduit 50 to control the gasoline vapor pressure entering the mixing chamber 52. As a throttle (not shown) is opened, the regulator will allow more gasoline vapor to pass therethrough due to the pressure difference on the two sides of the diaphram. When the throttle is closed, the flow is appropriately reduced and the regulator acts to prevent the gasoline vapor present in conduit 50 from escaping and polluting the atmosphere. A solenoid operated valve 62 also is provided in conduit 50 to prevent the escape of gasoline vapor from the system 10. Valve 62 is connected to and electrically activated by the vehicle's ignition system. When the key is turned in the ignition, the valve is opened allowing the flow of gasoline vapor therethrough. When the ignition is turned off the valve 62 is closed, preventing the flow of any additional vapor therethrough. This valve thereby prevents gasoline vapor from venting into the atmosphere when the engine is turned off. Otherwise, due to the heat in the pressure vessel, gasoline would still be vaporizing, rising into conduit 50, flowing past the pressure regulator and into the mixing chamber 52 whereupon it would vent to the atmosphere.

A second solenoid operated valve 64 is provided in conduit 50 as an additional safety valve to prevent the escape of gasoline vapor from the system in case the engine should stall with the ignition still on. If a stall were to occur, solenoid valve 62 would still be open and gasoline vapor could pass therethrough and vent to the atmosphere. To prevent this occurrance, a second solenoid valve is positioned within conduit 50 and electrically connected to the starter motor and mechanically connected to the manifold. When the starter motor is turned on the valve 64 is opened and held in the open position by the manifold vacuum pressure. Because the starter motor is on for only a brief period of time, it would not, by itself, hold the second valve 64 in the open position. Should the engine stall, the vacuum would be lost and the valve would close. Thus the combination of the two solenoid valves and the pressure regulator prevent the venting of gasoline vapor to the atmosphere and thereby further reduce pollution.

In operation, when the internal combustion engine equipped with the emission reduction system 10 is first started, the engine is cold and consequently the vapor pressure in the closed pressure vessel 26 is quite low. A second pressure sensing means 66 which is positioned within the pressure vessel reads this low pressure and activates a valve control mechanism 68 which orients valve 20 to communicate conduit 18 with conduit 22 thereby allowing the engine to run in the normal fashion. After a short period of operation, the engine exhaust passing through the heat exchange conduit 40 will vaporize the gasoline within the pressure vessel 26. The gasoline vapor then begins to rise and passes into conduit 50 to the pressure regulator 60. When the proper gaseous pressure is established, the pressure sensing means 66 activates the valve control mechanism 68 which switches the valve 20 to the alternate position which communicates conduits 18 and 24 and allows the liquid gasoline in the fuel tank 12 to be pumped into the pressure vessel 26. At this point the vaporized gasoline within conduit 50 is passing through the pressure regulator 60 and then into the mixing chamber 52 wherein the vapor rather than liquid gasoline will be mixed with the incoming air.

Finally, it must be noted that in the preferred embodiment of the invention, the liquid gasoline is vaporized by the heat from the exhaust. It must, of course, be recognized that alternative heat sources, for example an electric heater, can be used.

Various changes and modifications may be made in carrying out the present invention without departing from the scope and spirit thereof. Insofar as these changes and modifications are within the purview of the appended claims, they are to be considered as part of the invention.

What is claimed is:

1. An emission reduction system for internal combustion engines for use in combination with a carburetor having a conventional air intake, gas tank, fuel exhaust line, fuel pump, ignition system and fuel line communicating said gas tank with said carburetor, said system comprising a closed pressure vessel, a first conduit extending into said pressure vessel, valve means operable to communicate said first conduit with said fuel line whereby the fuel is pumped by said fuel pump into said pressure vessel, a second conduit positioned adjacent said pressure vessel, communicating with said exhaust line, and adapted to carry engine exhaust therethrough, whereby said exhaust vaporizes the fuel within said pressure vessel, means for regulating the exhaust flow through said second conduit whereby the heat within said conduit is controlled, a mixing chamber carried by said carburetor and adapted for the mixing of air and gasoline vapor therein, sensing means positioned within said pressure vessel, means for actuating said valve means to communicate said first conduit with said fuel line, said actuating means being connected to said sensing means whereby said sensing means activates said actuating means upon said sensing means reading a predetermined condition within said pressure vessel, a pressure regulator positioned on said first conduit, said regulator being adapted to control the pressure of the gasoline vapor entering the mixing chamber and second valve means positioned in said first conduit and adapted to prevent the passage of gasoline vapor therethrough upon turning off the engine.

2. The combination of claim 1 wherein said condition is the vapor pressure within said pressure vessel.

3. The combination of claim 1 wherein said condition is the temperature within said pressure vessel.

4. The combination of claim 1 wherein said exhaust regulating means comprises a diverter valve, means for actuating said diverter valve and a second sensing means positioned within said pressure vessel, said sensing means being connected to said actuating means whereby said sensing means activates said actuating means upon said sensing means reading a predetermined condition within said pressure vessel thereby controlling the diverter valve and the exhaust flow through said second conduit.

5. The combination of claim 1 wherein said second valve means is a solenoid valve, said solenoid being in electrical contact with the ignition system whereby said valve means is maintained in the open position when the ignition is on and in the closed position when the ignition system is turned off, thereby preventing the escape of gasoline vapor through said first conduit when the ignition is turned off.

6. The combination of claim 1 wherein said mixing chamber has an annular wall therein forming a venturi, said wall having a plurality of apertures therein, said apertures being adapted for the passage of gasoline vapor therethrough whereby said gasoline vapor mixes with the air being sucked down through the throat of the venturi.

7. An emission reduction system for internal combustion engines for use in combination with a carburetor having a conventional air intake, gas tank, fuel exhaust line, fuel pump, ignition system and fuel line communicating said gas tank with said carburetor, said system comprising a closed pressure vessel, a first conduit extending into said pressure vessel, valve means operable to communicate said first conduit with said fuel line whereby the fuel is pumped by said fuel pump into said pressure vessel, a second conduit positioned adjacent said pressure vessel, communicating with said exhaust line, and adapted to carry engine exhaust therethrough, whereby said exhaust vaporizes the fuel within said pressure vessel, means for regulating the exhaust flow through said second conduit whereby the heat within said conduit is controlled, a mixing chamber carried by said carburetor and adapted for the mixing of air and gasoline vapor therein, said chamber having an annular wall therein forming a venturi, said wall having a plurality of apertures therein, said apertures being adapted for the passage of gasoline vapor therethrough, sensing means positioned within said pressure vessel, means for actuating said valve means to communicate said first conduit with said fuel line, said actuating means being connected to said sensing means whereby said sensing means activates said actuating means upon said sensing means reading a predetermined condition within said pressure vessel, a pressure regulator positioned on said first conduit, said regulator being adapted to control the pressure of the gasoline vapor entering the mixing chamber, a solenoid valve means positioned in said first conduit, said solenoid being in electrical contact with the ignition system whereby said valve means is maintained in the open position when the ignition is on and in the closed position when the ignition is turned off, thereby preventing the escape of gasoline vapor through said first conduit when the ignition is turned off and a second solenoid valve positioned in said first conduit said solenoid being in electrical contact with a starter motor and in communication with the engine manifold so that said valve is opened upon activation of the starter motor, held in an open state by the vacuum pressure in the manifold and closed upon stalling of the engine due to loss of said vacuum thereby preventing the passage of gasoline vapor through said second solenoid valve upon the stalling of the engine.

8. The combination of claim 7 wherein said exhaust regulating means comprises a diverter valve, means for actuating said diverter valve and a second sensing means positioned within said pressure vessel, said sensing means being connected to said actuating means whereby said sensing means activates said actuating means upon said sensing means reading a predetermined condition within said pressure vessel, thereby controlling the diverter valve and the exhaust flow through said conduit.

9. The combination of claim 7 including a tubing member communicating said second solenoid valve with the intake manifold of the engine and said second solenoid valve being in electrical contact with the starter motor whereby said second solenoid valve is open upon the activating of the starter motor, held in the open position by the low pressure in the intake manifold and returned to the closed position by the stalling of the engine and the increase of pressure in the intake manifold, thereby preventing the escape of gasoline vapor through said first conduit upon the stalling of the engine.

10. The combination of claim 7 including a heat exchange member carried by said closed pressure vessel and extending into said second conduit.

11. The combination of claim 10 including means for regulating the fuel level within said pressure vessel.

* * * * *